US00RE34717E

United States Patent [19]

Sanders et al.

[11] E Patent Number: Re. 34,717

[45] Reissued Date of Patent: Sep. 6, 1994

[54] LIGHT STRING ORNAMENT CIRCUITRY

[75] Inventors: Robert E. Sanders, Lenexa, Kans.; Charles J. Flynn; John L. Vertreese, both of Kansas City, Mo.

[73] Assignee: Hallmark Cards Inc., Kansas City, Mo.

[21] Appl. No.: 681,905

[22] Filed: Apr. 8, 1991

Related U.S. Patent Documents

Reissue of:

[64] Patent No.: 4,682,079
Issued: Jul. 21, 1987
Appl. No.: 657,680
Filed: Oct. 4, 1984

[51] Int. Cl.[5] ..... H05B 37/00; H05B 39/00; H05B 41/00

[52] U.S. Cl. ..... 315/186; 315/185 S; 315/179; 315/201; 315/360; 362/806

[58] Field of Search ..... 315/76, 179, 185 R, 315/185 S, 192, 201, 207, 294, 312, 363, 360, 186, 193, 178, 210, 362, 256, 257; 428/11, 7; 446/242, 243, 484, 485, 297; 362/121-123, 253, 806, 252, 807, 808, 810, 811; 361/33, 56, 57, 67

[56] References Cited

U.S. PATENT DOCUMENTS

| | | | |
|---|---|---|---|
| 1,510,230 | 9/1924 | Johnston | 362/121 |
| 1,590,524 | 6/1926 | Keydel | 446/210 |
| 1,781,885 | 11/1930 | Sadacca | 362/392 |
| 1,822,798 | 9/1931 | Carrol | 362/807 X |
| 1,981,663 | 11/1934 | Pollock | 362/121 X |
| 2,058,677 | 10/1936 | Fritz | 362/806 X |
| 2,092,520 | 9/1937 | Nielsen | 362/121 X |
| 2,095,648 | 10/1937 | Oftedahl | 362/121 X |
| 2,188,529 | 12/1940 | Corina . | |
| 2,453,695 | 11/1948 | Belling . | |
| 2,462,750 | 2/1949 | Klein | 362/806 X |
| 2,500,899 | 3/1950 | Leahan | 362/806 X |
| 2,533,222 | 12/1950 | Cohen . | |
| 2,688,689 | 9/1954 | Christopher | 362/121 |
| 2,745,078 | 5/1956 | Wood, Jr. . | |
| 2,759,095 | 8/1956 | Kline . | |
| 2,760,120 | 8/1956 | Fisherman | 315/193 X |
| 2,802,095 | 8/1957 | Denning et al. . | |
| 2,857,506 | 10/1958 | Minteer . | |
| 2,875,421 | 2/1959 | Jordan . | |
| 3,118,617 | 12/1964 | Hellrich . | |
| 3,120,351 | 2/1964 | Kirsten . | |
| 3,214,579 | 10/1965 | Pacini . | |
| 3,263,350 | 8/1966 | Quinn | 362/806 X |
| 3,284,696 | 11/1966 | Nagata et al. | 323/310 |
| 3,465,139 | 9/1969 | Siegal . | |

(List continued on next page.)

OTHER PUBLICATIONS

Photocopies of photographs of alleged No. 2 Special.
Color photocopy of Noma 1971 Catalog p. 21 for a No. 2 Special.
Photographs of box and "Noma Christmas Tree Star" by Noma.
Photographs of box and "Electric Angel Chimes" By Keydel Co. of Detroit, Michigan.
Custom Research Inc. Lighted Christmas Ornament Focus Group Report of Groups Conducted Jul. 1, 1983.

*Primary Examiner*—David Mis
*Attorney, Agent, or Firm*—Leydig, Voit & Mayer Ltd.

[57] ABSTRACT

A decorative device is disclosed which includes 9 *an electromechanical device,* music module or [other electrical loads] *combinations of such devices* and electrical circuitry and a connector for connection to a selected socket of a string of conventional sockets for connection to an A.C. line. The connector includes an elongated flexible cable and is constructed to permit ready installation and positioning. Lamps may be provided in the device. The electrical circuit *optionally* includes a bridge rectifier and Zener diodes connected to insure continuous energization of lamps of the string while protecting against excessive voltages and minimizing safety hazards.

54 Claims, 7 Drawing Sheets

U.S. PATENT DOCUMENTS

| | | | |
|---|---|---|---|
| 3,522,515 | 8/1970 | Harner | 363/51 |
| 3,538,323 | 11/1970 | Ziegler | 362/806 |
| 3,603,780 | 9/1971 | Lu . | |
| 3,617,732 | 11/1971 | Fisher . | |
| 3,735,117 | 5/1973 | Hunt . | |
| 3,770,951 | 11/1973 | Corelli . | |
| 3,873,880 | 3/1975 | Riddell | 315/185 S X |
| 3,970,834 | 7/1976 | Smith . | |
| 3,982,173 | 9/1976 | Berry et al. | 361/56 |
| 3,985,924 | 10/1976 | Pritza . | |
| 4,020,201 | 4/1977 | Miller . | |
| 4,060,722 | 11/1977 | Foley . | |
| 4,068,118 | 1/1978 | Carrington . | |
| 4,072,857 | 2/1978 | DeVicaris . | |
| 4,099,824 | 7/1978 | Schoppelrey . | |
| 4,146,919 | 3/1979 | Jennings | 362/806 X |
| 4,156,892 | 5/1979 | Fisher . | |
| 4,161,768 | 7/1979 | Gauthier . | |
| 4,214,296 | 7/1980 | Magett | 362/3 |
| 4,253,045 | 2/1981 | Weber | 315/21 |
| 4,293,799 | 10/1981 | Roberts | 315/25 |
| 4,298,923 | 11/1981 | Lin | 362/806 X |
| 4,441,147 | 4/1984 | Schwarz | 363/2 |
| 4,450,382 | 5/1984 | Sawka et al. | 315/201 X |
| 4,500,795 | 2/1985 | Hochstein et al. | 315/360 X |
| 4,544,218 | 10/1985 | Sanders et al. | 339/31 L |
| 4,570,108 | 2/1986 | Stroede et al. | 315/36 |

FIG. 4
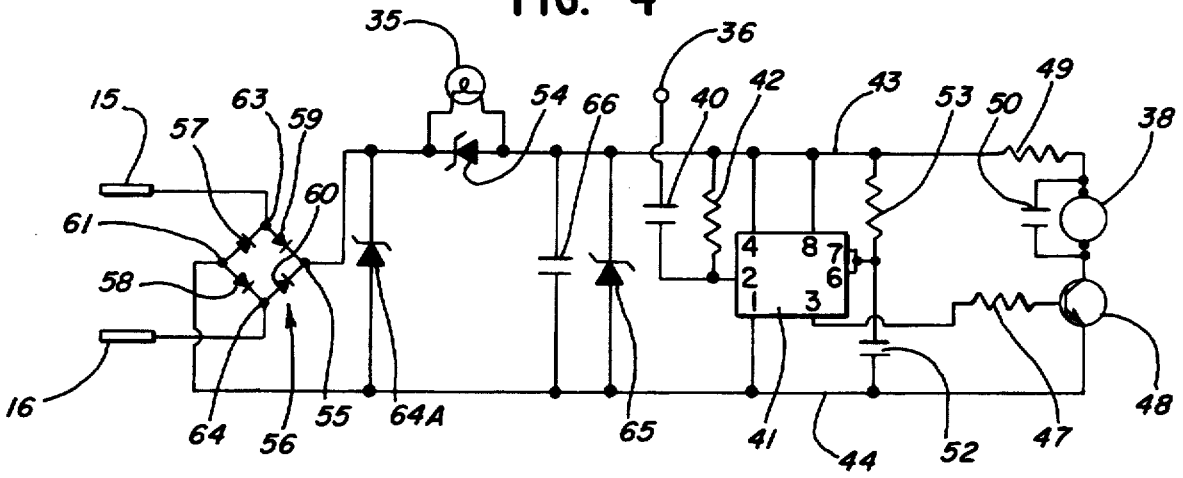
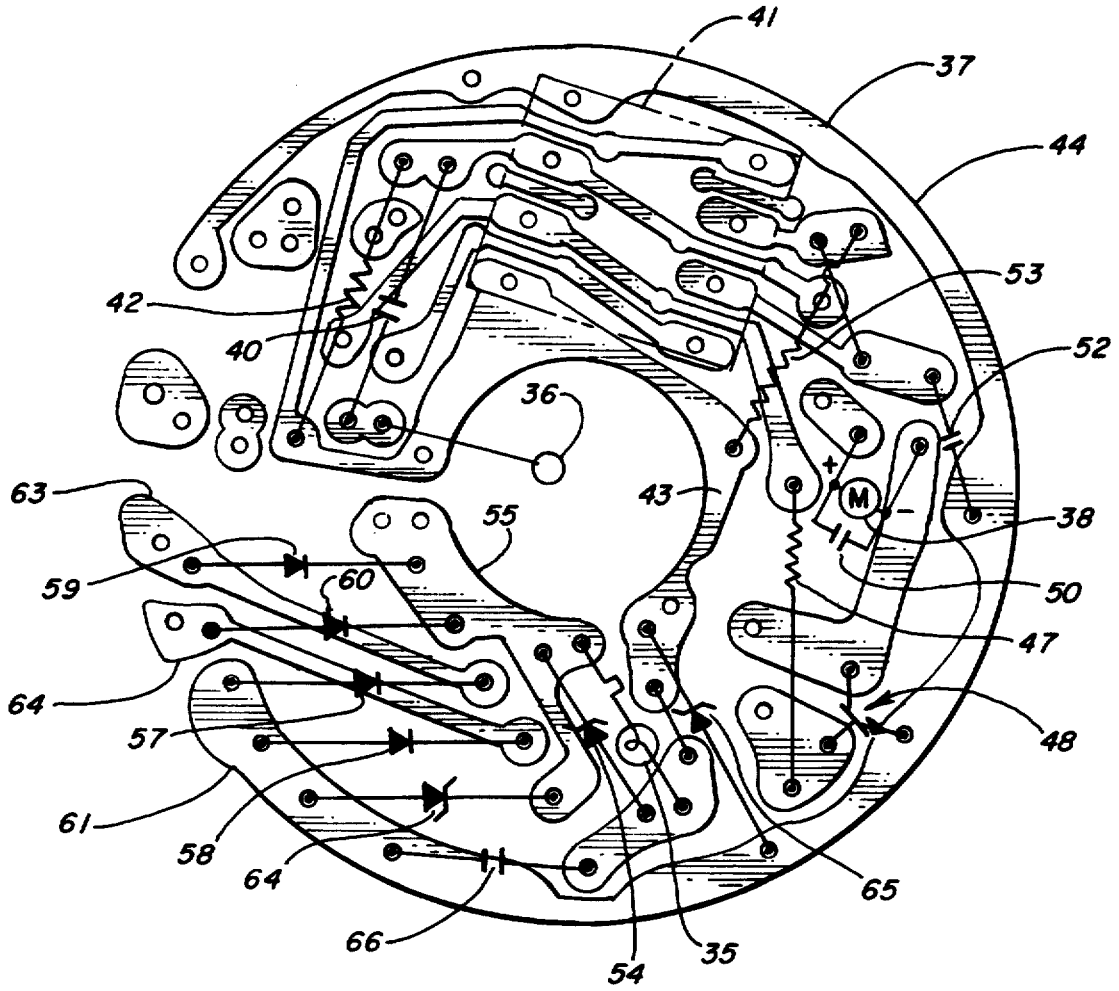
FIG. 5

FIG. 6
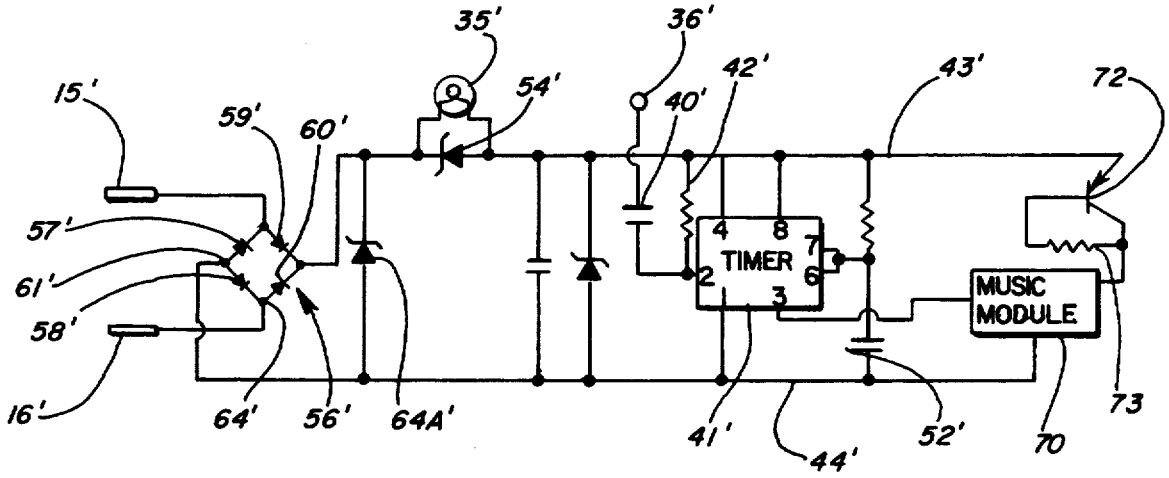
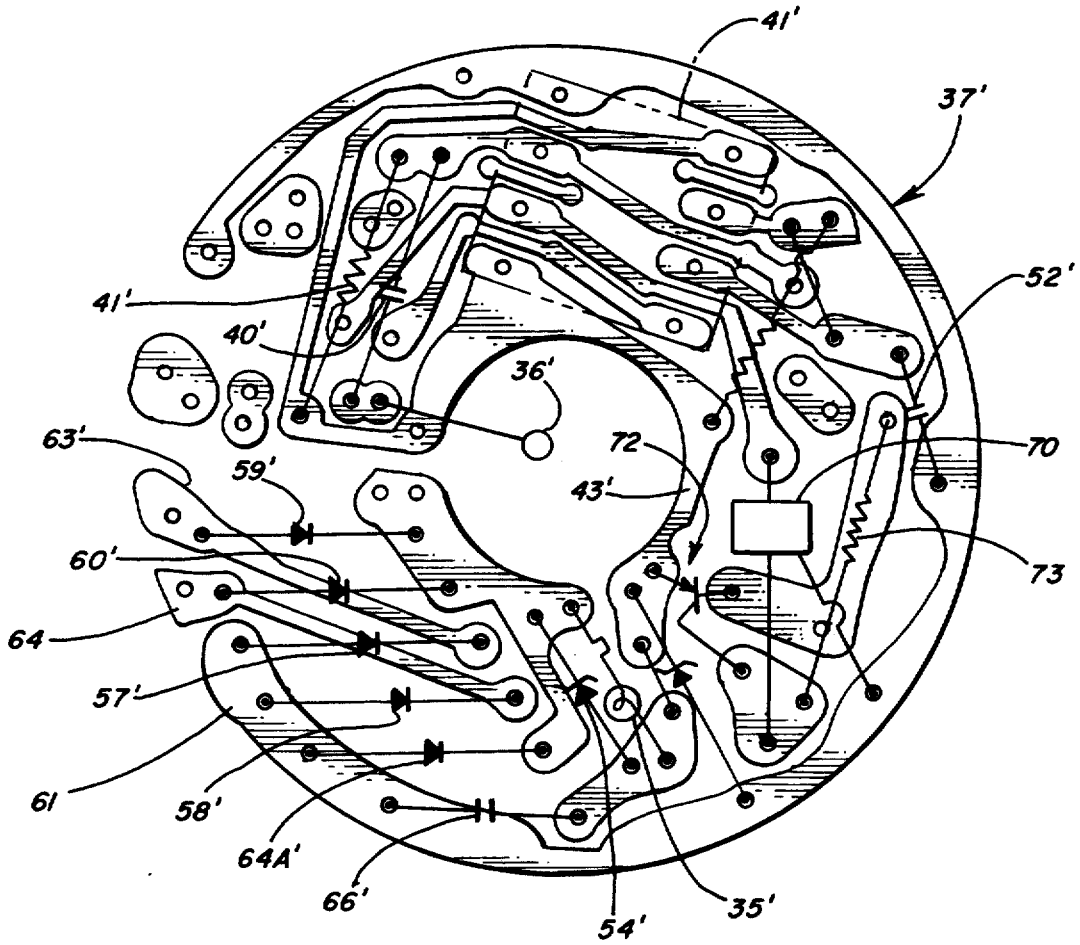
FIG. 7

FIG. 8
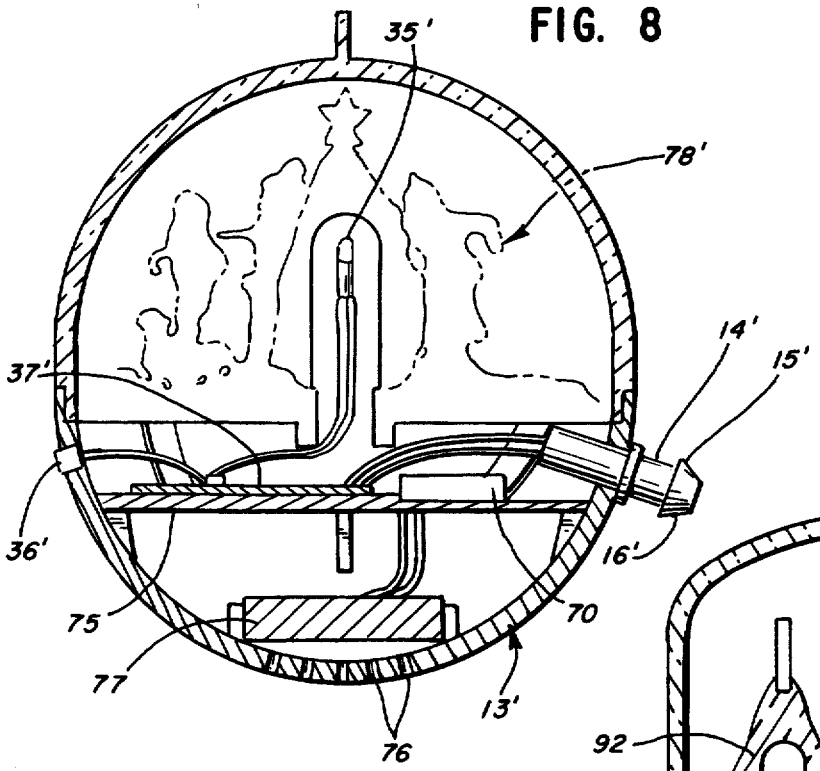
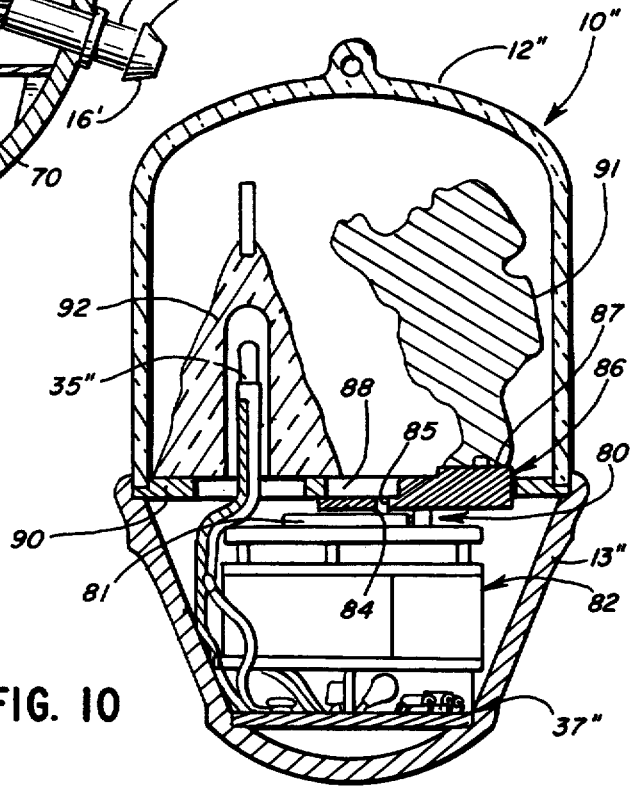
FIG. 10
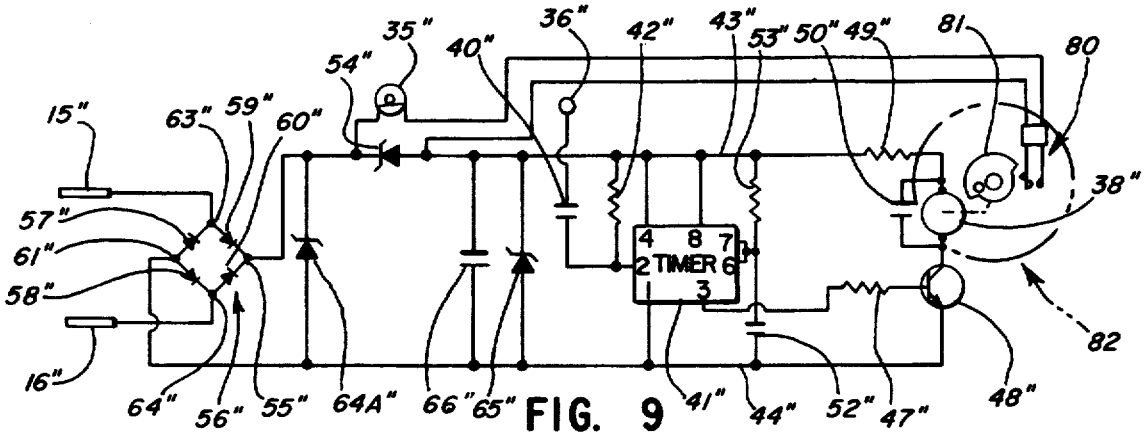
FIG. 9

FIG. 11
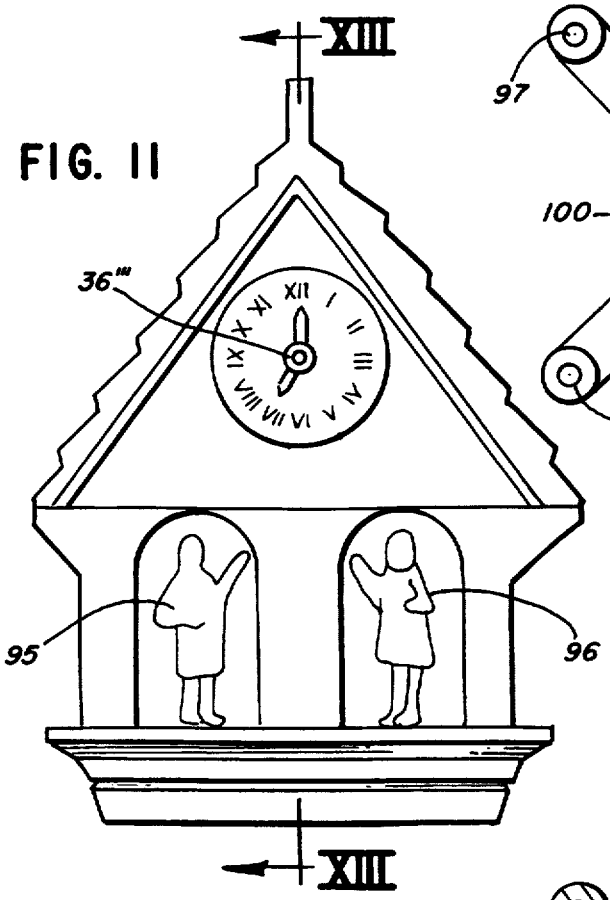
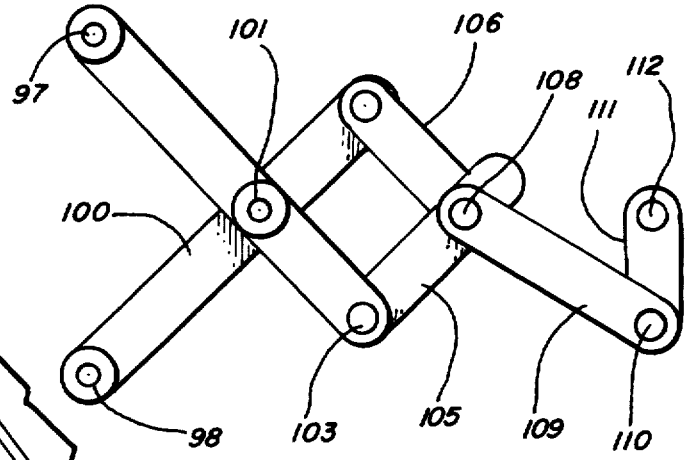
FIG. 12
FIG. 13
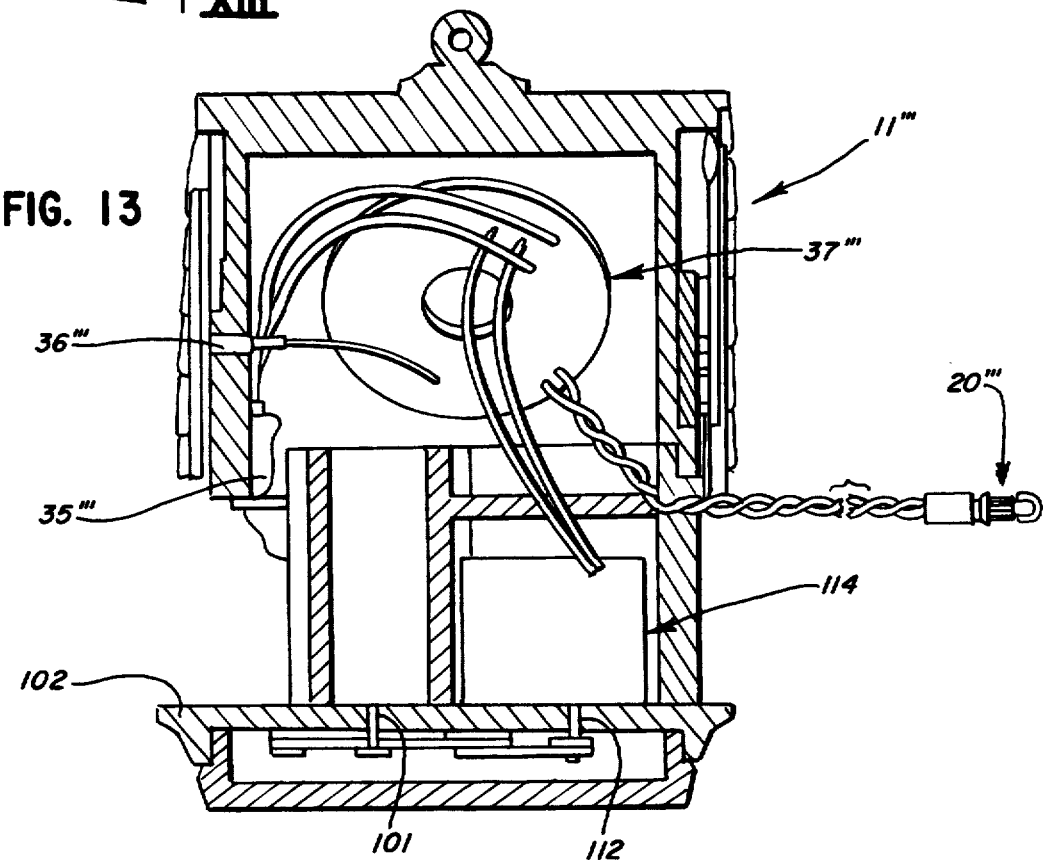

FIG. 14
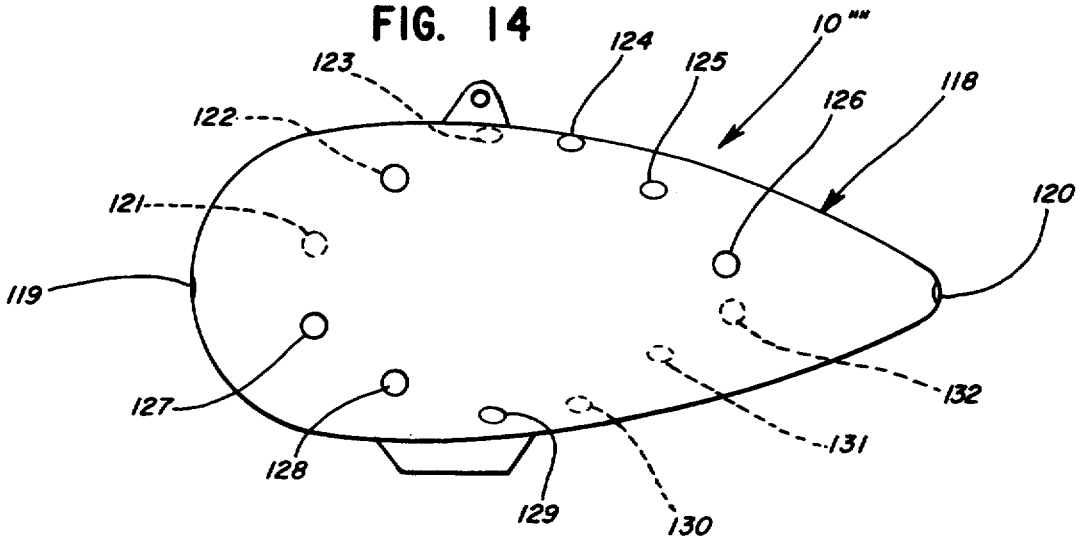
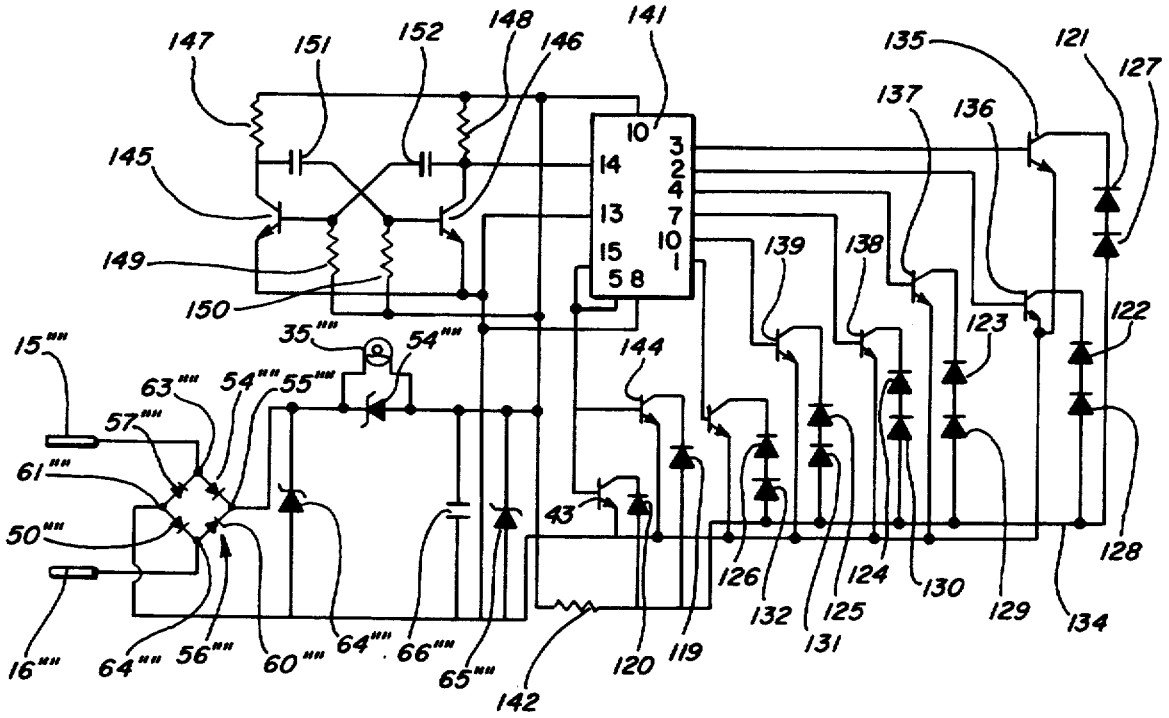
FIG. 15

LIGHT STRING ORNAMENT CIRCUITRY

Matter enclosed in heavy brackets [ ] appears in the original patent but forms no part of this reissue specification; matter printed in italics indicates the additions made by reissue.

This invention relates to ornaments for installation in a string of lights and more particularly to ornaments which have lights and electrically energizable musical and/or motion producing devices which cooperate to produce attractive sensory effects. Circuitry is provided for operating such devices in a safe and highly reliable manner, while being compact and readily and economically manufacturable.

BACKGROUND OF THE INVENTION

Ornaments for use in a string of lights have heretofore been provided which use electrically operated lamps or other devices to produce visual or musical effects. For example, ornaments have been available in the form of stars, leaves or the like designed to be connected to the socket of a miniature lamp in a string, to surround the lamp and to be illuminated therefrom. An important advance has been the provision of a special "pigtail" connector having connection means at one end arranged to be readily inserted into a standard socket and arranged to permit use of devices to produce a variety of attractive effects.

SUMMARY OF THE INVENTION

This invention was evolved with the general object of providing ornaments which produce enhanced effects and which are readily and economically manufacturable while being highly safe and reliable.

In ornaments constructed in accordance with the invention, electrical devices are provided for producing enhanced sensory effects. In one embodiment, an enhanced visual effect is produced by a rotating element driven through a gear reduction unit from a small electric motor. In another embodiment, a music module is provided which includes a small speaker energized from an integrated circuit which generates musical tones. Important aspects of the invention relate to the discovery and recognition that such devices can be connected in a string of lights to obtain safe, reliable and effective energization without adverse effects on the energization of lights of the string, provided that certain specific problems are overcome.

It is found that the lamps or lights in a conventional string have characteristics such as to produce desirable ballast and current-limiting effects, such that it is not necessary that there be an exact match between the electrical characteristics of a device to be energized and those of one of the conventional lights of the string. When current flows through the filament of a conventional lamp, its temperature is increased and as a result, the resistance thereof is increased, tending to reduce the current when energized from a constant voltage source. In a string of lamps, the initial current may be relatively high, but it levels off to develop a fairly constant voltage across each lamp of the string. It is found that when a device is connected in a string of lamps, the lamps operate as a constant current source, which is desirable in some respects. It is also found that the illumination obtained from each of the lamps is not adversely affected so long as the impedance of the device is a small fraction of the total operating impedance of the lamps.

It is additionally found, however, that the voltage applied to a device connected in a string of lamps is subject to wide variations, during initial energization of the string. It is also found that there can be highly adverse effects from the failure of components, especially when open circuits are produced. Such can result in voltage differences in the device nearly equal to the supply voltage applied to the string. Such problems are even more difficult when the device includes integrated circuits, or motors or lamps which necessarily or desirably require DC energization.

In an ornament constructed in accordance with the invention, connection means are provided to connect input terminals of a bridge rectifier in a string of lamps while a lamp of the ornament is connected in series with a load device and to output terminals of the bridge rectifier, with protection means being provided for limiting voltages across the lamp and the load device, and to thereby protect against possible highly adverse consequences of open circuit conditions. The connection of the lamp in the output circuit of the rectifier, in series with the load device, rather than in series with the input of the rectifier, is advantageous in connection with limiting voltages in the circuit and it permitting use of a lamp which does not need to match the lamps of the string. Preferably, the voltage across the lamp is limited by a single Zener diode, only one diode being required since the current is unidirectional in the output circuit of the rectifier. The Zener diode across the lamp provides additional protection against burn-out and extends the life of the lamp, to provide further protection against open-circuit conditions.

Another feature relates to the provision of a Zener diode in parallel relation to the load device, to provide the proper operating voltage thereto when it is energized and, more importantly, to permit deenergization of the load device while maintaining circuit continuity when it is deenergized. In preferred embodiments of the invention, a timer circuit is provided which is arranged to be triggered at the touch of the user, to energize a music module or a drive motor or the like for a predetermined time interval.

Another very important specific feature is in the connection of a Zener diode across the output terminals of the rectifier to provide back-up protection against the adverse effects of an open circuit. Preferably, its voltage rating is at least as great as the voltages across the lamp and the load device, the maximum values of such voltages being preferably established by the Zener diodes respectively connected across the lamp and the load device.

Further features of the invention relate to a circuit construction such that it is compact and readily assembled in an ornament while being economically manufacturable and highly reliable in operation.

The circuit of the invention is versatile, being readily adaptable for use in a variety of types of ornaments, and additional features of the invention relate to specific adaptations of the circuit to achieve special effects.

Still further features relate to physical constructions of ornaments to more fully utilize operations made possible with the circuit of the invention. In one particularly advantageous arrangement, a small circuit board, a miniature electric motor, a gear reduction assembly and a turntable are mounted within a hemispherical lower housing member and a miniature train is carried by the turntable and moves into and out of a tunnel provided within an upper hemispherical member, illuminated from within by a lamp energized from the circuitry of the invention.

This invention contemplates other objects, features and advantages which will become more fully apparent from the following detailed description taken in conjunction with the accompanying drawings.

BRIEF DESCRIPTION OF THE DRAWINGS

FIG. 4 is a schematic diagram of electrical circuitry of the ornament of FIG. 1;

FIG. 5 is a plan view of a circuit board which supports various components of the circuitry of FIG. 3, the connections of various components of the circuitry being illustrated diagrammatically in FIG. 4;

FIG. 6 is a schematic diagram of one modified circuit constructed in accordance with the invention;

FIG. 7 is a plan view similar to FIG. 5 illustrating the support of various components of the circuitry of FIG. 6 and the connections thereof;

FIG. 8 is a cross-sectional view similar to FIG. 3, but illustrating a modified ornament construction, including a music module energizable through the circuitry of FIG. 6;

FIG. 9 is a schematic diagram of another modified circuit in accordance with the invention;

FIG. 10 is an elevational sectional view of another ornament constructed in accordance with the invention;

FIG. 11 is a front elevational view of another ornament constructed in accordance with the invention;

FIG. 12 shows a linkage assembly of the ornament of FIG. 11;

FIG. 13 is an elevational sectional view of the ornament of FIG. 11;

FIG. 14 is a side elevational view of a "blimp" ornament of the invention;

FIG. 15 is a schematic diagram of circuitry of the ornament of FIG. 14;

DESCRIPTION OF PREFERRED EMBODIMENTS

Figure 1:
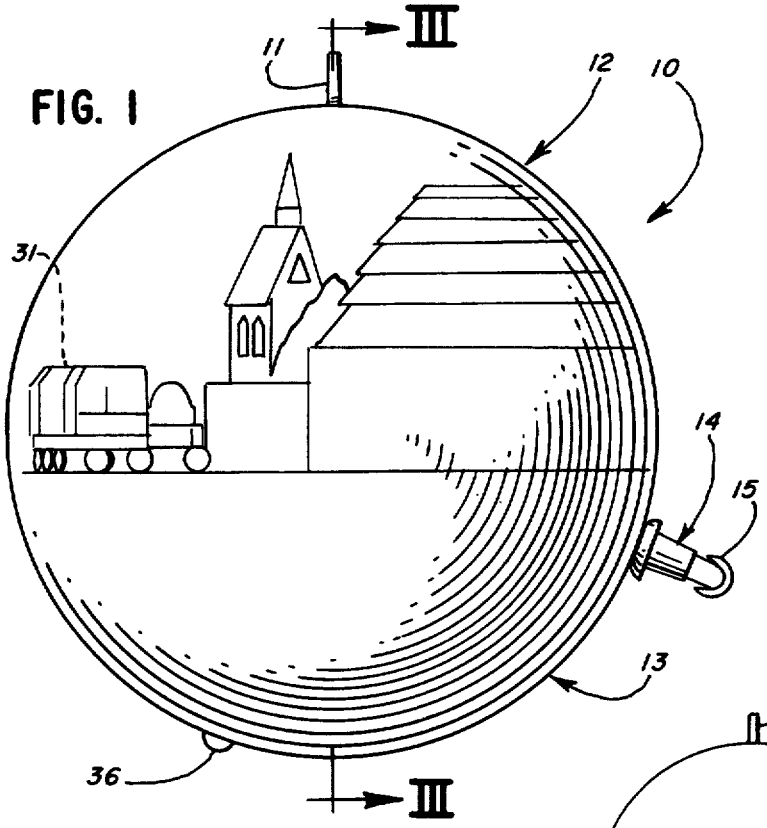
FIG. 1 is a side elevational view of one preferred embodiment of an ornament constructed in accordance with the invention.

Reference numeral 10 generally designates an ornament constructed in accordance with the principles of this invention. A hanger 11 is provided on the upper end of an upper housing member 12 which is of hollow semispherical shape and which has a lower rim portion secured to an upper rim portion of a lower housing member 13, also of hollow semispherical shape. A plug 14 is secured to the lower housing member 13 and has contacts 15 and 16 which form electrical power input terminals for the ornament 10. As illustrated diagrammatically in FIG. 2, the plug 14 is insertable into a socket 18 at one end of a pigtail connector device 19 and a plug 20 of the connector device 19 may be inserted into one socket 21 of a string of lights 22 which is connected to a plug 23 for insertion into a conventional 120-volt AC outlet. The string 22 includes many lights, only two sockets 25 and 26 and two lights 27 and 28 being shown in the diagrammatic showing of FIG. 2.

In the illustrated ornament 10, the wall of the upper housing member 12 is transparent, to permit viewing of the movement of a miniature train 31 which is mounted on a rotatable turntable or disc 32. The train 31 moves through tunnel structure formed by arcuately extending grooves in the underside of a member 33 which also has formations to simulate houses, trees and a church of a miniature village. The member 33 is of a translucent material and the lower housing structure 13 includes a post 34 which carries a lamp 35 at its upper end, the turntable 32 being rotatably journalled on the post 34.

Figure 3:
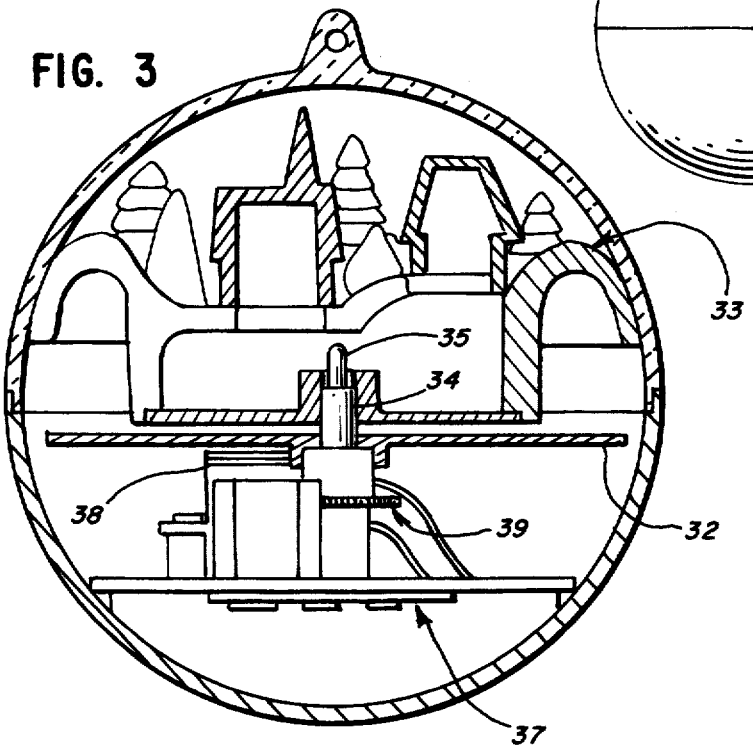
FIG. 3 is a cross-sectional view, taken substantially along line III—III of FIG. 1.

The lamp 35 may be energized continuously while the train 31 may be rotated only for a short period of time, in response to touching of a contact 36 on the outside of the lower housing member 13. Contact 36 is connected to circuitry on board 37 in the lower housing member, circuitry on the board 37 being operative to control a motor 38 which is mechanically coupled to the turntable 32 through a gear reduction unit 39, preferably including a pair of worm and worm gear assemblies. FIG. 3 is a schematic diagram of the circuitry on board 37.

In the operation of the circuitry of FIG. 3, the user touches the contact 36 which is connected through a capacitor 40 to a pin 2 of an integrated circuit 41, a standard type 555 timer circuit, pin 2 being a trigger pin thereof. The trigger pin 2 is normally maintained at a positive potential relative to other portions of the circuitry, through a resistor 42 which connects it to a positive voltage supply line 43. When contact 36 is touched, the potential of the pin 2 is at least momentarily moved in a negative direction, toward or below that of voltage supply line 44 which is connected to a ground pin 1 of the timer circuit 41. Pin 3 of the circuit 41 is then switched from a low level to a high level to initiate energization of the aforementioned motor 38 which drives the turntable 32 through a gear reduction unit 39.

As shown, pin 3 is connected through a resistor 47 to the base of a transistor 48. The emitter of transistor 48 is connected to line 44 while the collector thereof is connected to one terminal of the motor 38. The other terminal of motor 38 is connected through a current-limiting resistor 49 to the line 43 and a capacitor 50 is connected in parallel with the motor 38.

At the time of energization of motor 38, a capacitor 52 is in a discharged condition, a plus terminal thereof being connected to a discharge pin 7 of circuit 41 and a minus terminal thereof being connected to the negative supply line 43. The capacitor 52 is thereafter charged through a resistor 53 which connects its plus terminal to the positive supply line 43. The plus terminal of capacitor 52 is also connected to a threshold pin 6 of the circuit 41 and when the voltage across the capacitor 52 reaches a certain value, the circuit 41 is restored to its initial condition. A V+ pin 8 of the circuit 41 and also a reset pin 4 thereof are connected directly to the positive supply line 43.

Figure 2:
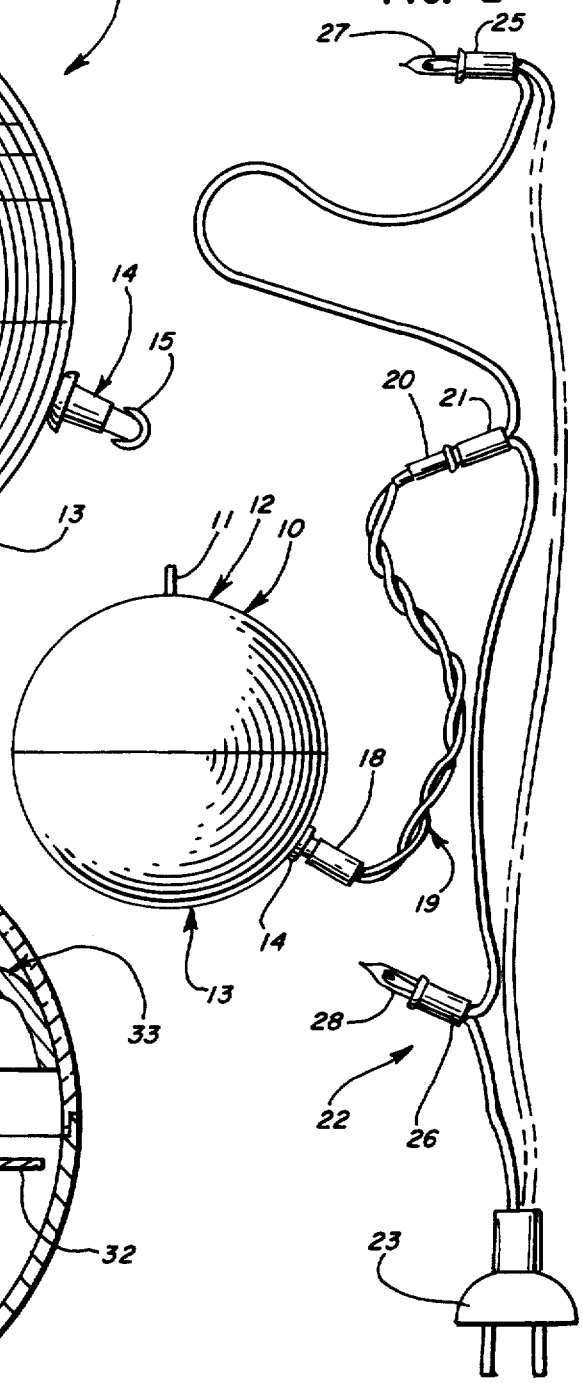
FIG. 2 is a view diagrammatically illustrating the connection of the ornament of FIG. 1 to a string of lights.

Important features of the invention relate to the supply of operating voltage to the lines 43 and 44 in a manner such as to protect against excessive voltage and current and to protect against hazards from failures of components while supplying current as required for operation of a load device such as the motor 38 of the embodiment of FIGS. 1–3. The circuitry of the invention also supplies operating voltage to the lamp 35 of the ornamental device 10 and utilizes electrical characteristics of the lamp 35 for obtaining optimum operation while providing protection against excessive current through the lamp 35.

In the circuit as illustrated in FIG. 3, the line 43 is connected through the lamp 35, and through a Zener diode 54 in parallel with the lamp 35, to a plus output terminal 55 of a bridge rectifier 56, formed by four diodes 57, 58, 59 and 60. The line 44 is connected to a minus output terminal 61 of the bridge rectifier 56. Input terminals 63 and 64 of the bridge rectifier 56 are connected to the contacts 15 and 16 for connection in the string of lights. A Zener diode 64 is connected between the output terminals 55 and 61 of the bridge rectifier 56 and another Zener diode 65 and a capacitor 66 are connected between the supply lines 43 and 44.

The values of the circuit components are such that in a quiescent condition, with no load current through the motor 38, DC current flows from the terminal 55 through the lamp 35 and the parallel Zener diode 54 to the line 43 and thence through Zener diode 65 to the line 44 and back to the minus output terminal 61 of the bridge rectifier 56. The capacitor 66 is maintained in a charged condition and cooperates with the lamp 35 and the Zener diode 65 in filtering out voltage variations produced in the rectification process. During such conditions the voltage across the lamp 35 is relatively high and there is little or no current through the Zener diode. When the touch contact 36 is touched to initiate operation of the timer circuit 41 and to energize the motor 38, current is diverted from the Zener diode 65 to flow through the current-limiting resistor 47 and the motor 38 and transistor 48. At the same time, current through the lamp 35 is increased but only to a small extent due to the Zener diode 54 which prevents the voltage across the lamp 35 from reaching an excessive value. Zener diode 54 is particularly important in maintaining circuit continuity in case the lamp 35 burns out.

The Zener diode 64 provides additional back-up protection. It carries no current during normal operation, its voltage rating being substantially higher than the total of the voltage ratings of the Zener diodes 54 and 65. It is, however, very important in providing protection against possible adverse effects from failure of any of the components, especially with respect to any failure which might create an open circuit between the output terminals 55 and 61 of the bridge rectifier 56. Since the input of the rectifier 56 is connected in series with a string of lamps, a voltage nearly equal to the input supply line voltage, 120 volts for example, would appear between lines 15 and 16 if there were an open circuit between terminals 55 and 61. As a result, excessive inverse polarity might be developed across the diodes 57–60.

As aforementioned, the diode 54 provides protection against burning-out of the lamp 35, but there is, of course, a possibility that both could present an open circuit. In the event of an open circuit produced by failure of the diode 65, a very high DC voltage would be produced across the integrated circuit 41 to provide a likelihood of failure thereof. Such open circuits could also produce potentially serious shock and first hazards. For these reasons, the providion of the Zener diode 64 as well as the Zener diodes 54 and 65 is very important.

By way of illustrative example and not by way of limitation, the circuit components may have values, types or ratings as follows:

| Reference Numeral | Value, Type or Rating |
|---|---|
| 40 | 100 picofarads |
| 42 | 2.7 megohms |
| 47 | 100 ohms |
| 48 | Type 2N2222 |
| 49 | 22 ohms |
| 50 | 0.01 microfarads |
| 52 | 22 microfarads |
| 53 | 3.9 megohms |
| 54 | 6.2 volts |
| 57–60 | Type IN4005 |
| 64 | 15 volts |
| 65 | 5.1 volts |
| 66 | 100 microfarads |

FIG. 5 shows the circuit board 37 which supports and connects the various components of the circuitry of FIG. 4, the positioning and connections of the various components being diagrammatically indicated. It will be understood that other forms of circuit boards may be used.

FIG. 6 shows a modified circuit which includes many components like those of FIG. 4, corresponding components being indicated by primed numbers. The circuit of FIG. 6 differs from that of FIG. 4 in that it operates to energize a music module 70, rather than the motor 38. Pin 3 of a timer circuit 41' is connected directly to one terminal of the module 70, another terminal of the module 70 being connected to line 44' and a third terminal thereof being connected to the collector of a transistor 72 having an emitter connected to line 43' with the base of transistor 72 being connected to its collector through a resistor 73. Transistor 72 operates to limit current and to provide, in effect, a constant current source for the music module 70.

The music module 70 is of a previously known type containing circuitry for automatically operating for a certain time interval after being triggered. Only a short triggering pulse need be applied thereto and the RC timing circuit may have a relatively short time constant. For example, capacitor 52' may have a value of 1.0 microfarads and resistor 53' may have a resistance of 15,000 ohms. Transistor 72 may be a type 3N3906.

FIG. 7 illustrates the support and connection of components of the circuit of FIG. 5 on a circuit board 37' which is like the circuit board 37.

FIG. 8 is a cross-sectional view similar to FIG. 3 but illustrating a modified ornament construction 10', utilizing the circuitry of FIG. 6 and incorporating the music module 70. The music module 70 is mounted on a plate 75 which is disposed within a lower housing member 13', an upper housing member 12' being provided which has a rim portion secured to the rim of the lower housing member 13'. The lower housing member 13' has openings 76 below a miniature speaker 77 which is connected to the music module 70. The circuit board 37' is mounted on the plate 75 and is connected to the lamp 35' which projects upwardly on the inside of translucent decorative structures 78. The upper housing member 12' may be of transparent or translucent material. A plug 14' projects from one side of the lower housing member and a touch contact 36' is provided, preferably at a diametrically opposite position.

FIG. 9 illustrates a modified circuit which is similar to that of FIG. 4, corresponding components being indicated by double-primed numbers. The circuit of FIG. 9 differs from that of FIG. 4 in that a switch 80 is connected in series with the lamp 35'' of the circuit. As diagrammatically illustrated, the switch 80 is periodically operated between open and closed positions by a cam 81 which is driven by a drive unit 82 which includes motor 38'' and a gear reduction assembly.

FIG. 10 is an elevational sectional view of an ornament 10'' incorporating the circuitry of FIG. 9 which is mounted on a circuit board 37'' located in the lower portion of a lower housing member 13'' forming a base of the ornament 10''. The circuit board 37'' is substantially identical to the circuit board 37 of FIG. 5 and, as shown in FIG. 10, it is disposed below the drive unit 82. The cam 81 is secured to an upwardly projecting output shaft of the unit 82 and it carries an upwardly projecting pin 84 which is disposed in a slot 85 of a slide 86. Slide 86 has a guide portion 87 which projects upwardly through a slot 88 in a floor 90, and a FIG. 91 is secured to the upper end of the guide portion 87, the illustrated FIG. 91 being a Santa Claus figure. Slot 85 in the slide 86 is transverse to the slot 88 in the floor 90. The pin 84 is offset from the axis of rotation of the cam 81 and when the cam 81 is rotated, the slide 86 and FIG. 91 are reciprocated back and forth. In the illustrated ornament, the Santa Claus FIG. 91 is moved toward and away from a tree 92, and an outstretched hand of the FIG. 91 is moved into proximity to the top of the tree 92, simulating the placement of an ornament thereon.

The lamp 35'' is located within the tree 91 which is of a translucent material. The angular relationship of the pin 84 and switch-actuating portions of the cam 81 are such in relation to the placement of the switch 80 as to cause the lamp 35'' to be energized when the outstretched hand of the Santa Claus FIG. 91 reaches the tree 92 and to cause the lamp 35'' to be deenergized when the FIG. 91 is moved to a position near the limit of its travel away from the tree.

A touch switch contact 36'' for initiating operation of the motor 38'' is located at one side of the lower housing member 13'' and a plug 14'' projects from the member 13'' at a diametrically opposite point, for connection of the ornament 10'' in a string of lights.

It is noted that the provision of the Zener diode 54'' in the circuit of the ornament 10'' is particularly desirable in providing assurance of circuit continuity when the lamp 35'' is deenergized through opening of the switch 80.

FIG. 11 is a front elevational view of another ornament 11''' constructed in accordance with the invention. The ornament 11''' is in the form of a miniature house and it includes a pair of miniature FIGS. 95 and 96 arranged to emerge from the front of the house, swing into facing relation, and then swing back to positions within the ornament.

To actuate the FIGS. 95 and 96 they are glued to pins 97 and 98 on the outer ends of a pair of arms 99 and 100 of a linkage assembly shown in FIG. 12, the arms 99 and 100 being pivoted on a pin 101 which depends from a floor portion 102 of the ornament 11'''. The inner ends of arms 99 and 100 are connected by pins 103 and 104 to links 105 and 106 which are connected to a pin 108. Pin 108 is connected through a link 109 to a pin 110 on an arm 111 affixed to a shaft 112 of a drive unit 114. As shown in FIG. 13, the drive unit 114 is mounted within the ornament 11''' and it is connected to a circuit board 37''' which is connected to a lamp 35''' positioned above the region into which the FIGS. 95 and 96 emerge. The circuit board 37'' may be substantially identical to the circuit board 37 of FIGS. 3 and 4 and it is connected to a touch switch contact 36''' mounted in a clock-face portion of the ornament 10'''. When the contact 36''' is touched, a motor of the unit 114 is energized for a certain predetermined interval of time, from one to two minutes, for example. Circuit board 37''' is connected through "pigtail" wires to a plug 20''' arranged to be inserted into one socket of a conventional light string.

FIG. 14 shows another ornament 10'''' which includes a housing 118 in the form of a miniature blimp with a pair of lights 119 and 120 on the front and back ends thereof and twelve lights 121–132 at various positions around side surfaces thereof, each of the lights 119–132 being a light-emitting diode or "LED".

FIG. 15 is a schematic diagram of a circuit for the ornament 10''''. The circuit includes components like those of the circuit of FIG. 3, corresponding components being indicated by quadruple-primed numbers. A lamp 36'''' is included which may be located within the housing 118, the housing 118 having wall portions of a translucent or transparent material.

LED's 121–126 are respectively connected in series with LED's 127–132 between a line 134 and the collectors of transistors 135–140 which have grounded emitters and which have base electrodes connected to pins 3, 2, 4, 7, 10 and 1 of a type 4017 integrated circuit 141, a decade counter/divider circuit. Line 134 is connected through a resistor 142 to the positive supply line 43'''', the negative supply line 44'''' being connected to circuit ground. The LED's 119 and 120 are connected between line 134 and the collectors of two additional transistors 143 and 144 which have grounded emitters and which have base electrodes connected together and to pins 5 and 15 of the circuit 141. Pin 14 of circuit 141, which is a clock input terminal, is connected to the output of a free-running multivibrator 144, formed by transistors 145 and 146 having grounded emitters, resistors 147 and 148 connected between line 43'''' and the collectors of transistors 145 and 146, resistors 149 and 150 connected between line 43'''' and the bases of transistors 145 and 146 and capacitors connected between the collectors of transistors 145 and 146 and the bases of the opposite transistors.

The values of the components may be such as to obtain an operating frequency of on the order of 3 Hz. When pulses at the operating frequency are applied to the clock input of circuit 141, high signals are sequentially developed at the pins 3, 2, 4, 7, 10, 1 and 5 to sequentially turn on the transistors 135–140 and then the pair of transistors 143 and 144, to cause energization of the LED's connected thereto. The high signal developed at pin 5 is applied directly to pin 15 which is a reset pin of the circuit 141.

By way of example and not by way of limitation, the various components may have values, types or ratings as follows:

| Reference Numeral | Value, Type or Rating |
|---|---|
| 54'''' | 6.2 volts |
| 65'''' | 6.2 volts |
| 66'''' | 100 microfarads |
| 135–140, 143,144, 145,146 | Type 2N2222 |
| 142 | 180 ohms |

-continued

| Reference Numeral | Value, Type or Rating |
|---|---|
| 147,148 | 680 ohms |
| 149 | 39,000 ohms |
| 150 | 12,000 ohms |
| 151,152 | 6,8 microfarads |

Figure 16:
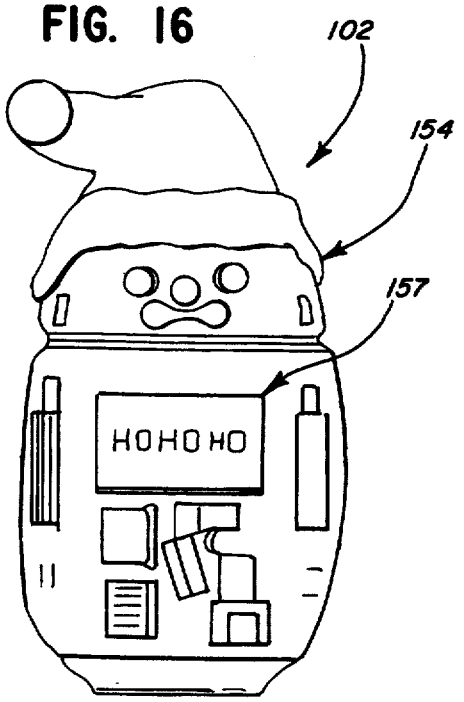
FIG. 16 is a front elevational view of a robot ornament of the invention.
Figure 17:
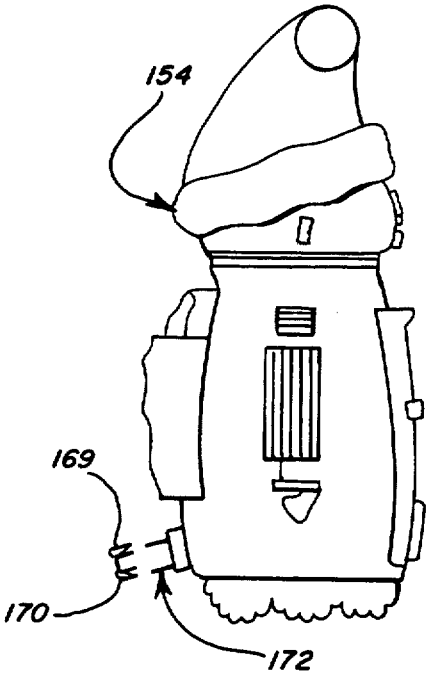
FIG. 17 is a side elevational view of the ornament of FIG. 16.

FIGS. 16 and 17 show another ornament 10 V which is constructed in accordance with the invention and which includes a housing 154 in the form of a miniature Santa Claus robot. The housing 154 includes a window piece 157 with "HO HO HO" imprinted or formed thereon. Three LED lights 158–160 are provided behind the window piece and a miniature speaker 162 is provided within the housing 156, above a bottom piece of which has sound-transmitting openings therein.

Figure 18:
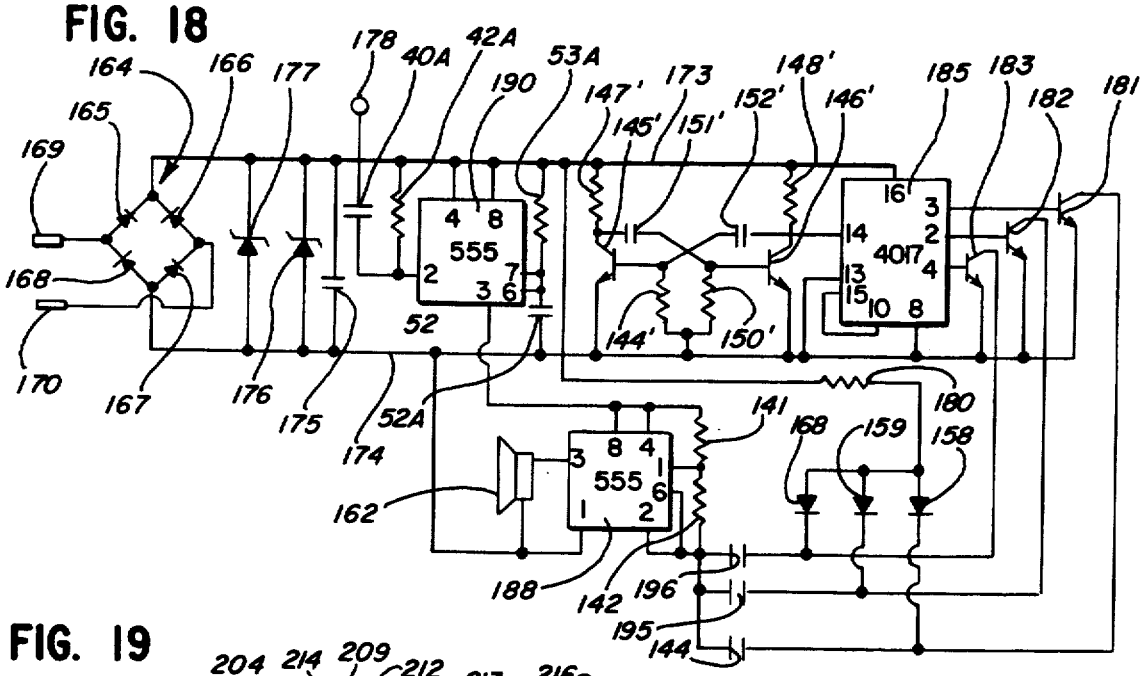
FIG. 18 is a schematic diagram of circuitry of the robot ornament of FIGS. 16 and 17.

A circuit for energizing the LED's 158–160 and speaker 162 is shown in FIG. 18. A bridge rectifier 164 is provided which includes four diodes 165–168 and which has input terminals connected to terminals 169 and 170 of a plus 172 which projects from the housing 156 as shown in FIG. 17. Output terminals of the bridge rectifier 164 are connected to plus and minus output lines 173 and 174. A filter capacitor 175 and two Zener diodes 176 and 177 are connected in parallel and to the lines 173 and 174. The diodes 176 and 177 have different voltage ratings. For example, the diode 176 may have a rating of 5.1 volts and the diode 177 may have a rating of 12 volts. As a result, the diode 176 with the lower rating is normally operative to limit the voltage between the lines 173 and 174 and the diode 177 with the higher rating does not normally conduct. The diode 177 is however, very important in providing a back-up to limit the voltage in the event of failure of the diode 176 or in case of momentary voltage surges such as might occur during initial energization of a string of lights.

When the circuit is energized, the LED's 158–160 are continually energized in sequence and when sound effects are desired they may be initiated by touching a touch switch contact 178 on the outside of the housing 156. The speaker is then energized to develop tones of different pitches in sequence in synchronism with the flashing of the LED's 158–160, continuing for a certain time interval which may be on the order of one to two minutes, for example.

The LED's 158–160 have anodes connected through a resistor 180 to the line 173 and cathodes connected to the collectors of three transistors 181, 182 and 183, the emitters of which are connected to line 174. The bases of transistors 181–183 are connected to pins 3, 2 and 4 of a Type 4017 decade counter/divider circuit 185 which has V+ and V− pins 16 and 8 connected to lines 173 and 174. Pin 10 of the circuit 185 is connected to pin 15 to reset the circuit upon the development of the fourth count after being triggered. Trigger or clock pulses are applied to pin 14 from a free-running multivibrator circuit 186 which is like the circuit 148 of FIG. 15, corresponding components being indicated by primed numbers. The values of the components may be the same except that each of the resistors 149' and 150' may have a value of 68,000 ohms to provide longer time constants and a lower operating frequency, which may be on the order of 1 Hz, for example.

To apply audio tones to the speaker 162, it is connected between line 174 and output pin 3 of a Type 555 timer circuit 188. Reset pin 4 and VC pin 8 of circuit 188 are connected to output pin 3 of another Type 555 timer circuit 190 which is connected to the touch switch contact 178 and which controls the duration of the time interval in which audio signals are developed.

A resistor 191 is connected between discharge pin 7 and pins 4 and 8 of circuit 188 and another resistor 192 is connected between pin 7 and a circuit point 193 which is connected to trigger pin 2 and threshold pin 6 and also to the terminals of three capacitors 194–196, the other terminals of capacitors 194–196 being connected to the collectors of transistors 181–183.

When operating voltage is supplied from pin 3 of circuit 190 and when one of the transistors 181–183 is conductive, the timer circuit 188 operates as a free-running circuit to generate an audio signal at a frequency determined by the value of whichever one of the capacitors 194 is connected to the then-conductive one of the transistors 181. Thus an audio tone of a certain pitch is generated in synchronism with the flashing of each of the LED's 158–160.

The circuitry associated with the timer circuit 190 is like that shown in FIG. 4 and it includes a capacitor 40A, a resistor 42A, a capacitor 52A and a resistor 53A, respectively corresponding to capacitor 40, resistor 42, capacitor 52 and resistor 53.

By way of example and not by way of limitation, the components of the circuit of FIG. 18 may have values or may be of types, as follows:

| Reference Numeral | Value or Type |
|---|---|
| 180 | 120 ohms |
| 181–183 | Type 2N2222 |
| 191 | 3,300 ohms |
| 192 | 390 ohms |
| 194 | 0.15 microfarads |
| 195 | 0.33 microfarads |
| 196 | 0.15 microfarads |

Figure 19:
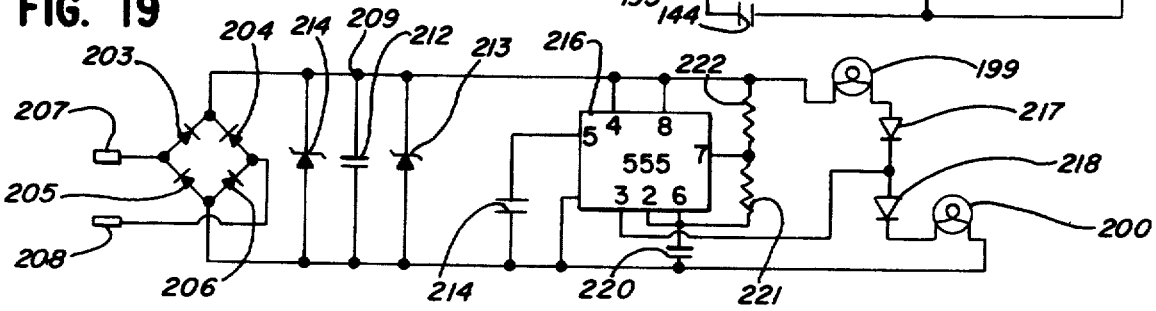
FIG. 19 is a schematic diagram of another circuit of the invention.

FIG. 19 shows another circuit constructed in accordance with the invention, arranged for alternately energizing two lamps 199 and 200. A bridge rectifier 202 is provided which includes four diodes 203–206 and which has input terminals connected to terminals 207 and 208 which are in the form of contacts like the contacts 15 and 16, associated with a plug like the plug 14 for connection in a string of lights. Output terminals of the rectifier 202 are connected to plus and minus output lines 209 and 210 and a filter capacitor 212 and two Zener diodes 213 and 214 are connected in parallel with each other and between the lines 209 and 210. The diodes 213 and 214 have different voltage ratings and operate like the diodes 176 and 177 of the circuit of FIG. 18. For example, the diode 213 may have a voltage rating of 12 volts while the diode 214 may have a voltage rating of 15 volts.

To energize the lamps 199 and 200, a Type 555 integrated circuit 216 is provided which has an output pin 3 connected to the cathode of a diode 217 and to the anode of a diode 218 with the anode of diode 217 being connected through the lamp 199 to the line 209 and with the cathode of diode 218 being connected through lamp 200 to the line 210. The trigger pin 2 and the threshold pin 6 of the circuit 216 are connected through a capacitor 220 to line 210 and also through a resistor 221 to the discharge pin 7 which is connected through a resistor 222 to the line 209. The control voltage pin 5 is connected through a capacitor 224 to the line 210; pin 1 is connected directly to line 210 and pins 4 and 8 are connected directly to line 209.

With the connections as shown, the circuit 216 operates as a free-running circuit to generate a square wave at the output pin 3, energizing the lamp 199 when the pin 3 is low and energizing the lamp 200 when the pin 3 is high.

By way of example, the resistors 221 and 222 may have values of 1.5 megohms and 33 kiloohms and the capacitors 220 and 224 may have values of 10 microfarads and 0.01 microfarads, respectively. The operating frequency may be on the order of 0.05 Hz.

In normal operation with the circuit of FIG. 19, there is a load connected between lines 209 and 210 at substantially all times since one or the other of the lamps 199 is energized. However, if one lamp should burn out, the diode 213 with the lower rating will conduct during the times when that lamp would otherwise conduct, to provide current continuity in the light string, further protection being provided by the diode 214 with the higher voltage rating.

It will be understood that modifications and variations may be effected without departing from the spirit and scope of the novel concepts of this invention.

We claim:

1. An ornament for installation in a string of lights connected to an AC line voltage source to be in series with the lights of the string, said ornament comprising: ornamental means for producing attractive visual effects, an electrically operated load device arranged when energized to produce sensory effects augmenting the attractive visual effects produced by said ornamental means, a coupling circuit having a pair of input terminals and a pair of output terminals and arranged to provide a path for current flow from one input terminal and thence in one direction from one output terminal to the other through a load coupled thereto and then to the other input terminal and to also provide a path for current flow from said other input terminal and thence in said one direction from said one output terminal to the other through load coupled thereto and thence to said one input terminal to thereby provide for AC current flow between said input terminals of said coupling circuit while providing for DC current flow through said load, means arranged for connecting said input terminals of said coupling circuit in said string of lamps in series relation to all other lamps of said string, connection means defining a load which includes said load device and which is connected to said output terminals of said coupling circuit, and protection means operative in the absence of current through said load for insuring a path for current flow of at least a certain magnitude in said one direction from said one output terminal to said other output terminal and insuring AC current flow through all lights of said string, said certain magnitude of current flow being sufficient for energization of all lights of said string at substantially full intensity, and said protection means being effective for limiting the voltage between said output terminals of said coupling circuit, to thereby insure AC current flow through lights of said string irrespective of DC current drawn by said connection means and to protect against excessive voltages between said input terminals of said coupling circuit and across said connection means.

2. In an ornament as defined in claim 1, said ornamental means including a lamp, and said connection means including means connecting said lamp and said load device in series relation to each other.

3. In an ornament as defined in claim 1, said protection means including a Zener diode connected in said connection means in parallel relation to said load device.

4. In an ornament as defined in claim [1] *2*, said protection means including a Zener diode connected in said connection means in parallel relation to said lamp.

5. In an ornament as defined in claim 1, said protection means including a Zener diode connected between said output terminals of said coupling circuit.

6. In an ornament as defined in claim 2, said protection means including a Zener diode connected between said output terminals and having a voltage rating greater than the total voltage developed across said lamp and said load device in normal operation.

7. In an ornament as defined in claim 6, said Zener diode being a first of three Zener diodes including a second Zener diode connected across said lamp and a third Zener diode connected across said load device, the total of the voltage ratings of said second and third Zener diodes being less than that of said first Zener diode.

8. In an ornament as defined in claim [1] *2*, timer means arranged to be triggered to energize said load device for a predetermined time interval, and switch means operable by a user to trigger said timer means.

9. In an ornament as defined in claim 8, said protection means including a Zener diode connected in parallel relation to said load device and arranged to maintain current conduction through said lamp and through lamps of said string of lamps when said load device is not energized through operation of said timer means.

10. In an ornament as defined in claim 9, said timer means comprising an integrated circuit having voltage supply terminals connected to said Zener diode with said Zener diode being operative to maintain a substantially constant supply voltage for said integrated circuit.

11. In an ornament as defined in claim 10, a filter capacitor connected in parallel with said Zener diode.

12. In an ornament as defined in claim 11, said connection means including a lamp connected in series with said load device, and said protection means comprising a second Zener diode connected in parallel with said lamp.

13. In an ornament as defined in claim 12, said protection means further comprising a third Zener diode connected to said output terminals of said bridge rectifier and having a voltage rating which is about at least as high as the total of the voltage ratings of the first and second Zener diodes.

14. In an ornament as defined in claim 1, said load device comprising a music module arranged to produce a series of musical tones when energized.

15. In an ornament as defined in claim 1, said load device comprising, a movable element and electric motor means for effecting movement of said element.

16. In an ornament as defined in claim 15, said movable element being a rotatable disc element, and speed reduction drive means driven by said motor and operative to rotate said disc element at a relatively slow speed.

17. In an ornament as defined in claim 16, said disc element being rotatable about a horizontal axis, and a miniature train supported on said disc element.

18. In an ornament as defined in claim 15, said connection means including a lamp connected in series with said load device, and switch means actuated by said movable element and connected in series with said lamp.

19. In an ornament as defined in claim 18, said protection means comprising a Zener diode connected across the series combination of said switch means and said lamp.

20. In an ornament as defined in claim 15, reciprocable means driven by said movable element.

21. In an ornament as defined in claim 20, said connection means including a lamp connected in series with said load device, switch means actuated by said movable element in synchronism with the operation of said reciprocable means and connected electrically in series with said lamp.

22. In an ornament as defined in claim 1, said load means comprising multi-pitch audible tone generating means, a plurality of lamps, and means for energizing said lamps in synchronism with the generation of tones of different pitches by said tone generating means.

23. In an ornament as defined in claim 22, said audible tone generating means comprising a resistance-capacitance timing circuit for controlling the generated pitch, and said load means comprising a plurality of transistors selectively energizable to control the time constant of said circuit and to simultaneously energize one of said lamps.

24. In an ornament as defined in claim 1, said connection means including a first lamp connected in series with said load device, at least one lamp in addition to said first lamp, and lamp-energizing means for energizing said lamps in a certain sequence.

25. In an ornament as defined in claim 24, said lamp-energizing means including a free-running multivibrator circuit.

26. In an ornament as defined in claim 24, said lamp-energizing means further including a counter circuit energized from said multivibrator circuit and arranged to control the sequence of energization of said lamps.

27. In an ornament as defined in claim 1, a timer circuit for controlling energization of said load device and having a trigger input terminal, a touch switch contact, capacitance means connected between said touch switch contact and said trigger input terminal, and resistance means connecting said trigger input terminal to one terminal of said rectifier to keep said trigger input terminal at substantially the same potential as said one terminal of said rectifier when said contact is untouched for a substantial length of time with a triggering signal being applied through said capacitor when said contact is touched.

28. In an ornament as defined in claim 1, said protection means including first and second Zener diodes connected in parallel relation to each other and to said output terminals of said coupling circuit, said first diode having a voltage rating not substantially higher than the normal DC operating voltage of said connection means, and said second diode having a somewhat higher voltage rating to be normally nonconductive but to become condutive and to provide protection with respect to voltage transients and failure of said first diode.

29. In an ornament as defined in claim 1, said coupling circuit comprising a bridge rectifier.

30. A decorative device for electrical connection in a string of conventional sockets for miniature Christmas lights or the like, each of said conventional sockets including a hollow housing of insulating material having an open end with a pair of contacts within said housing arranged for engagement with contacts of a conventional miniature Christmas light and interconnected through flexible conductors with contacts of other conventional sockets of said string, said device comprising electrical circuit means which includes electrically energizeable *electromechanical* load means producing enhanced sensory effects and a connector for connecting said device to said string, said connector being arranged for connection to a selected socket of [a] *said* string of conventional sockets mounted in a stationary position on a tree and said connector being arranged to provide an extension cord to obtain flexibility and mobility in the placement of said electrically operated load means on the tree with respect to said string of stationary conventional sockets, said connector including an elongated flexible cable having at least two conductors, first connection means at one end of said cable for connection of said conductors thereof to said load means, and second connection means at the opposite end of said elongated flexible cable for connection of said conductors thereof to contacts of a selected one of said conventional sockets, said second connection means including a member of insulating material and contact means carried by said member to form a plug assembly arranged to fit within the hollow housing of said one of said conventional sockets and to electrically connect said conductors of said cable with the contacts of said selected one of said conventional sockets, said load means being thereby connected electrically in said string in place of a light which might otherwise be inserted in said selected one of said conventional sockets and said load means being thereby movable to any desired position on said tree within the length of said flexible cable from said selected one of said stationary conventional sockets.

*31. A device according to claim 30 wherein said electromechanical load means is a motor.*

*32. A device according to claim 31 wherein said motor is a direct current motor.*

*33. A device according to claim 30 wherein said electrical circuit means includes a lighting means.*

*34. A device according to claim 30, wherein said electrical circuit means includes electrically energizable electroacoustical load means producing enhanced sensory effects.*

*35. A device according to claim 34, wherein said electrical circuit means includes lighting means.*

*36. A decorative device for electrical connection in a string of conventional sockets for miniature Christmas lights or the like, each of said conventional sockets including a hollow housing of insulating material having an open end with a pair of contacts within said housing arranged for engagement with contacts of a conventional miniature Christmas light and interconnected through flexible conductors with contacts of other conventional sockets of said string, said device comprising electrical circuit means which includes electrically energizable electroacoustical load means producing enhanced sensory effects and a connector for connecting said device to said string, said connector being arranged for connection to a selected socket of said string of conventional sockets mounted in a stationary position on a tree and said connector being arranged to provide an extension cord to obtain flexibility and mobility in the placement of said electrically operated load means on the tree with respect to said string of stationary conventional sockets, said connector including an elongated flexible cable having at least two conductors, first connection means at one end of said cable for connection of said conductors thereof to said load means, and second connection means at the opposite end of said elongated flexible cable for connection of said conductors thereof to contacts of a selected one of said conventional sockets, said*

*second connection means including a member of insulating material and contact means carried by said member to form a plug assembly arranged to fit within the hollow housing of said one of said conventional sockets and to electrically connect said conductors of said cable with the contacts of said selected one of said conventional sockets, said load means being thereby connected electrically in said string in place of a light which might otherwise be inserted in said selected one of said conventional sockets and said load means being thereby movable to any desired position on said tree within the length of said flexible cable from said selected one of said stationary conventional sockets.*

*37. A device according to claim 36 wherein said electroacoustical load means comprises a sound transducer.*

*38. A device according to claim 36 wherein said electroacoustical load means comprises a speaker and wherein said circuit means comprises a music module.*

*39. A device according to claim 36 wherein said electrical circuit means includes a lighting means.*

*40. A decorative device for electrical connection in a string of conventional sockets for miniature Christmas lights or the like, each of said conventional sockets including a hollow housing of insulating material having a non-circular open end with a pair of laterally spaced contacts within said housing arranged for engagement with contacts of a conventional miniature Christmas light and interconnected through flexible conductors with contacts of other conventional sockets of said string, said device comprising electrical circuit means which includes load means including at least one lamp and at least one light emitting diode producing enhanced sensory effects, a plurality of flexible conductors, and a connector for connecting said device to said string, said connector being non-circular and said connector being arranged for being matably connectable to a selected socket of said string of conventional sockets mounted in a stationary position on a tree and said connector being arranged to provide an extension cord to obtain flexibility and mobility in the placement of said electrically operated load means on the tree with respect to said string of stationary conventional sockets, said connector including an elongated flexible cable having at least two conductors, first connection means at one end or said cable for connection of said conductors thereof to said load means, and second connection means at the opposite end of said elongated flexible cable for connection of said conductors thereof to contacts of a selected one of said conventional sockets, said second connection means including a member of insulating material and contact means carried by said member to form a plug assembly arranged to fit within the hollow housing of said one of said non-circular conventional sockets and to electrically connect said conductors of said cable with the contacts of said selected one of said non-circular conventional sockets, said load means being thereby connected electrically in said string in place of a light which might otherwise be inserted in said selected one of said conventional sockets and said load means being thereby movable to any desired position on said tree within the length of said flexible cable from said selected one of said stationary conventional sockets.*

*41. A decorative device for electrical connection in a string of conventional sockets for miniature Christmas lights or the like, each of said conventional sockets including a hollow housing of insulating material having an open end with a pair of contacts within said housing arranged for engagement with contacts of a conventional miniature Christmas light and interconnected through flexible conductors with contacts of other conventional sockets of said string, said device comprising electrical circuit means which includes electrically energizable load means producing enhanced sensory effects which vary as function of time and a connector for connecting said device to said string, said electrical circuit means having impedance characteristics which are such as to maintain continuous energization of lights in said string of sockets while energizing said load means in producing said enhanced sensory effects which vary as a function of time, said connector being arranged for connection to a selected socket of said string of conventional sockets mounted in a stationary position on a tree and said connector being arranged to provide an extensin cord to obtain flexibility and mobility in the placement of said elecrically operated load means on the tree with respect to said string of stationary conventional sockets, said connector including an elongated flexible cable having at least two conductors, first connection means at one end of said cable for connection of said conductors thereof to said load means, and second connection means at the opposite end of said elongated flexible cable for connection of said conductors thereof to contacts of a selected one of said conventional sockets, said second connection means including a member of insulating material and contact means carried by said member to form a plug assembly arranged to fit within the hollow housing of said one of said conventional sockets and to electrically connect said conductors of said cable with the contacts of said selected one of said conventional sockets, said load means being thereby connected electrically in said string in place of a light which might otherwise be inserted in said selected one of said conventional sockets and said load means being thereby movable to any desired position on said tree within the length of said flexible cable from said selected one of said stationary conventional sockets.*

*42. A device according to claim 41, wherein said electrical circuit means includes control circuit means operative to develop an output changing as a function of time, and wherein said electrically energizable load means includes means connected to said output of said control circuit means to produce said enhanced sensory effects which vary as a function of time.*

*43. A device according to claim 42, wherein said electrically energizable load means includes lighting means coupled to said output of said control circuit means to produce lighting effects which vary as a function of time.*

*44. A device according to claim 43, wherein said lighting means includes light emitting diode means.*

*45. A device according to claim 42, wherein said control circuit means includes electronic timer means.*

*46. A device according to claim 45, wherein said control circuit means includes a music module and wherein said electrically energizable load means includes a speaker coupled to said music module.*

*47. A device according to claim 41, wherein said electrically energizable load means includes an electric motor and wherein said device includes an ornamental structure moved by said electric motor to produce said enhanced sensory effects which vary as a function of time.*

*48. A device according to claim 41, wherein said electrically energizable load means includes electroacoustical load means.*

*49. A device according to claim 41, wherein said electrical circuit means includes voltage limiting means.*

*50. A device according to claim 49, wherein said voltage limiting means includes Zener diode means.*

*51. A decorative device for electrical connection in a string of conventional sockets for miniature Christmas lights or the like, each of said conventional sockets includ-*

*ing a hollow housing of insulating material having an open end with a pair of contacts of a conventional miniature Christmas light and interconnected through flexible conductors with contacts of other conventional sockets of said string, said device comprising electrical circuit means which includes electrically energizable load means, said load means comprising motor means having a rotatable portion and a fixed portion, said decorative device including fixed decorative means and movable decorative means, said movable decorative means being operatively connected to said rotatable portion of said motor means to provide movement of said movable decorative means relative to said fixed decorative means for an enhanced sensory effect, and a connector for connecting said device to said string, said connector being arranged for connection to a selected socket of said string of conventional sockets mounted in a stationary position on a tree and said connector being arranged to provide an extension cord to obtain flexibility and mobility in the placement of said electrically operated load means on the tree with respect to said string of stationary conventional sockets, said connector including an elongated flexible cable having at least two conductors, first connection means at one end of said cable for connection of said conductors thereof to said load means, and second connection means at the opposite end of said elongated flexible cable for connection of said conductors thereof to contacts of a selected one of said conventional sockets, said second connection means including a member of insulating material and contact means carried by said member to form a plug assembly arranged to fit within the hollow housing of said one of said conventional sockets and to electrically connect said conductors of said cable with the contacts of said selected one of said conventional sockets, said load means being thereby connected electrically in said string in place of a light which might otherwise be inserted in said selected one of said conventional sockets and said load means being thereby movable to any desired position on said tree within the length of said flexible cable from said selected one of said stationary conventional sockets.*

*52. The decorative device of claim 51 wherein one of said decorative means is generally spherical and the other of said decorative means moves relative thereto.*

*53. The decorative device of claim 52 wherein said spherical decorative means is diaphanous and the other decorative means moves within said spherial means and is visible therethrough.*

*54. The decorative device of claim 52 wherein the other of said decorative means rotates relative to said spherical decorative means.*

* * * * *